United States Patent
Song et al.

(10) Patent No.: US 12,437,387 B2
(45) Date of Patent: Oct. 7, 2025

(54) SCREEN DEFECT DETECTION METHOD, APPARATUS, AND ELECTRONIC DEVICE

(71) Applicant: GOERTEK OPTICAL TECHNOLOGY CO., LTD, Shandong (CN)

(72) Inventors: Xiufeng Song, Shandong (CN); Yifan Zhang, Shandong (CN); Jie Liu, Shandong (CN); Wenchao Zhang, Shandong (CN)

(73) Assignee: GOERTEK OPTICAL TECHNOLOGY CO., LTD, Shandong (CN)

( * ) Notice: Subject to any disclaimer, the term of this patent is extended or adjusted under 35 U.S.C. 154(b) by 398 days.

(21) Appl. No.: 18/246,806

(22) PCT Filed: Aug. 25, 2021

(86) PCT No.: PCT/CN2021/114453
§ 371 (c)(1),
(2) Date: Mar. 27, 2023

(87) PCT Pub. No.: WO2022/062812
PCT Pub. Date: Mar. 31, 2022

(65) Prior Publication Data
US 2023/0368361 A1    Nov. 16, 2023

(30) Foreign Application Priority Data
Sep. 28, 2020  (CN) .................. 202011039225.X (51) Int. Cl.
*G06T 7/00*   (2017.01)
*G06T 7/11*   (2017.01)

(52) U.S. Cl.
CPC ............. *G06T 7/0004* (2013.01); *G06T 7/11* (2017.01); *G06T 2207/30164* (2013.01)

(58) Field of Classification Search
CPC .................... G06T 7/0004; G06T 7/11; G06T 2207/30164; G06T 7/62
See application file for complete search history.

(56) References Cited

U.S. PATENT DOCUMENTS 9,230,316 B2 *   1/2016   Huang .................. G06T 7/13
2015/0187064 A1  7/2015   Huang
(Continued)

FOREIGN PATENT DOCUMENTS

CN   108683907 A   10/2018
CN   110111711 A    8/2019
(Continued)

*Primary Examiner* — Bobbak Safaipour
(74) *Attorney, Agent, or Firm* — Ingrassia Fisher & Lorenz, LLP (57) ABSTRACT

A screen defect detection method and apparatus and an electronic device are disclosed. The method comprises the following steps: identifying a number of suspected defective pixel points(S110) from a detection image of a target screen; determining a suspected defect region(S120) corresponding to a suspected defective pixel point in the detection image; dividing the suspected defect region into a general region and a core region(S130); and judging whether the target screen has a transparent defect(S140) according to a mean gray value of the suspected defect region, a mean gray value of the general region and a minimum gray value of the core region.

12 Claims, 6 Drawing Sheets

(56) References Cited

U.S. PATENT DOCUMENTS

| | | | |
|---|---|---|---|
| 2017/0004612 A1 | 1/2017 | Hsu et al. | |
| 2018/0246044 A1* | 8/2018 | Zhang | |
| 2021/0174489 A1* | 6/2021 | Liu | G06T 7/11 |
| 2023/0326006 A1* | 10/2023 | Wang | G06V 10/44 382/141 |

FOREIGN PATENT DOCUMENTS

| | | |
|---|---|---|
| CN | 110766736 A | 2/2020 |
| CN | 111062910 A | 4/2020 |
| CN | 111462113 A | 7/2020 |
| CN | 111563889 A | 8/2020 |
| CN | 111612757 A | 9/2020 |
| CN | 111612781 A | 9/2020 |
| CN | 111627009 A | 9/2020 |
| CN | 112348773 A | 2/2021 |

\* cited by examiner

SCREEN DEFECT DETECTION METHOD, APPARATUS, AND ELECTRONIC DEVICE

CROSS-REFERENCE TO RELATED APPLICATIONS

This Application is a U.S. National-Stage entry under 35 U.S.C. § 371 based on International Application No. PCT/CN2021/114453, filed Aug. 25, 2021 which was published under PCT Article 21(2) and which claims priority to Chinese Application No. 202011039225.X, filed Sep. 28, 2020, which are all hereby incorporated herein in their entirety by reference.

TECHNICAL FIELD

This application pertains to the field of workpiece inspection, in particular to a screen defect detection method and apparatus and an electronic device.

BACKGROUND

The quality of the screen has a great impact on the user experience, especially for devices mainly relying on the screen to interact with users, such as VR (Virtual Reality) devices and AR (Augmented Reality) devices. Many screen manufacturers perform defect detection on the screen before it leaves the factory, such as detecting whether the screen has bad spots, scratches, etc. In most of the time the detection is performed manually, and the efficiency is low. Especially for transparent defects caused by foreign matters on the screen, they are difficult to find by manual detection, and the rate of missed inspection and false inspection is high. In addition, other objects, desirable features and characteristics will become apparent from the subsequent summary and detailed description, and the appended claims, taken in conjunction with the accompanying drawings and this background.

SUMMARY

In view of the problem that the existing technology cannot effectively detect the defects in the screen, the present disclosure proposes a screen defect detection method and apparatus and an electronic device to overcome the above problems.

In order to achieve the above object, the following technical solutions are adopted in the present disclosure.

According to an aspect of the present disclosure, a screen defect detection method is provided, which comprises the following steps:

identifying a number of suspected defective pixel points from a detection image of a target screen;

determining a suspected defect region corresponding to a suspected defective pixel point in the detection image;

dividing the suspected defect region into a general region and a core region; and judging whether the target screen has a defect according to a mean gray value of the suspected defect region, a mean gray value of the general region and a minimum gray value of the core region.

According to another aspect of the present disclosure, a screen defect detection apparatus is provided, which comprises:

an identification unit for identifying a number of suspected defective pixel points from a detection image of a target screen;

a suspected defect region determination unit for determining a suspected defect region corresponding to a suspected defective pixel point in the detection image;

a dividing unit for dividing the suspected defect region into a general region and a core region; and a judgment unit for judging whether the target screen has a transparent defect according to a mean gray value of the suspected defect region, a mean gray value of the general region and a minimum gray value of the core region.

According to yet another aspect of the present disclosure, an electronic device is provided, which comprises: a processor; and a memory configured to store computer executable instructions, which cause the processor to execute the screen defect detection method as described above when executed.

According to still yet another aspect of the present disclosure, a computer-readable storage medium is provided, which stores one or more programs. When the one or more programs are executed by an electronic device comprising a plurality of application programs, the electronic device performs the screen defect detection method as described above.

In sum, the beneficial effects of the present disclosure are as follows. The manual detection is replaced by automatic screen defect detection, which improves efficiency and saves labor costs. The suspected defective pixel points are detected by image filtering algorithm first, and then the combination of region division and gray value comparison is used to determine whether the target screen has a transparent defect, which improves the accuracy of defect detection.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Exemplary embodiments will be described in detail below with reference to the accompanying drawings. Although exemplary embodiments of the present disclosure are shown in the drawings, it should be understood that the present disclosure can be implemented in various forms and should not be limited by the embodiments described herein. On the contrary, these embodiments are provided in order to understand the present disclosure more thoroughly and to convey the scope of the present disclosure to those skilled in the art completely.

The transparent defect of the screen mainly refers to the defect caused by the adhesion of fuzz, paper scraps, etc., on the screen surface. "Transparent" means that the screen light can pass through these foreign matters, resulting in the situation that the brightness of the screen at this part is dim although it is luminous. This kind of defect generally does not need to be returned to the factory for treatment, and can be improved by wiping, but if it is assembled or packaged for sale without treatment, it will still give users a poor experience.

The technical concept of the present disclosure is that, considering the characteristics of the transparent defect, it is determined by using the gray value, and the defect area may be used for recheck, thereby preventing the problems of time-consuming and laborious manual detection and low accuracy. The solutions of the present disclosure can be applied to all kinds of screens, such as the screen of VR glasses, etc.

The technical solutions of the present disclosure will be illustratively described below in conjunction with specific embodiments.

Figure 1:
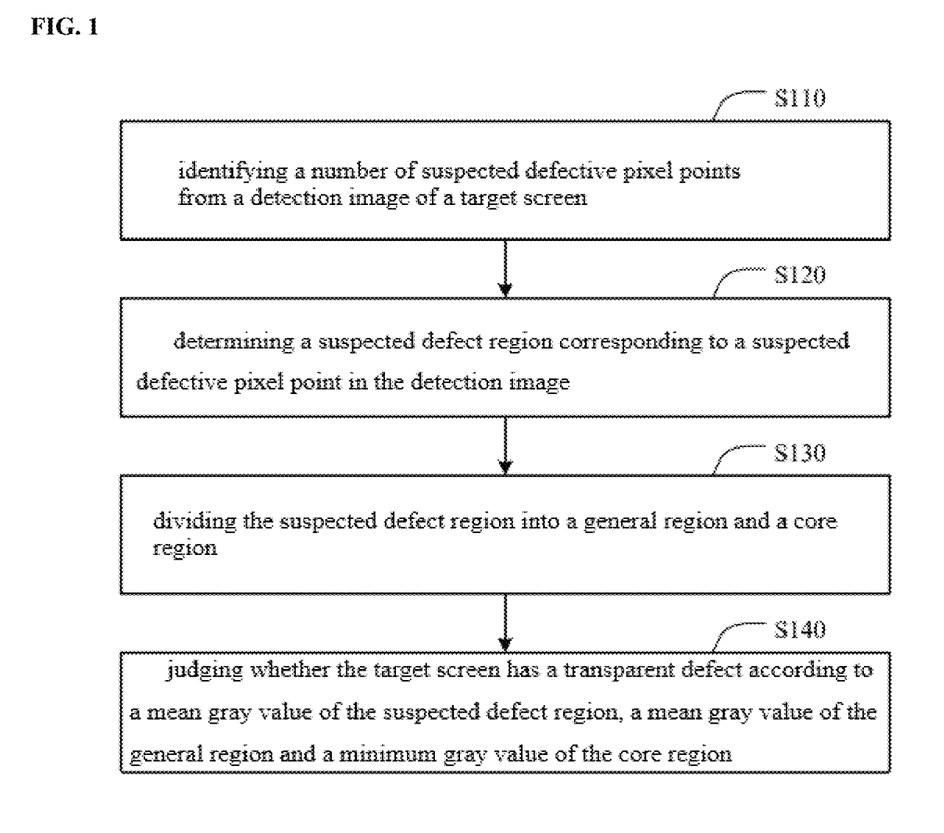
FIG. 1 is a flowchart of a screen defect detection method according to an embodiment of the present disclosure.

FIG. 1 is a flowchart of a screen defect detection method according to an embodiment of the present disclosure. As shown in FIG. 1, the screen defect detection method comprises the following steps:

Step S110, identifying a number of suspected defective pixel points from a detection image of a target screen;

Obtaining the detection image of the target screen is the basis for realizing automatic defect detection, which can generally be obtained by taking photo of the target screen. In order to facilitate the subsequent counting and calculation of gray values, the detection image may specifically be a gray image.

For example, in an embodiment of the present disclosure, the above screen defect detection method further comprises: obtaining an original image capable of containing the target screen; converting the original image into a gray image; detecting an effective region corresponding to the target screen from the gray image, and clipping the gray image according to the effective region to obtain the detection image of the target screen.

Of course, in other embodiments, alternatively, the gray image containing the target screen may be directly captured by using a camera, thereby eliminating the step of converting the original image into a gray image.

When performing screen detection, usually only the image content of this part of the screen is needed. However, when taking photo of the screen, it is unavoidable to capture the screen border and so on, so the gray image may be clipped. Specifically, it may be achieved in the following ways:

performing screen contour search based on the binary image of the gray image to obtain a screen contour line; and determining an effective region according to the circumscribed rectangle of the screen contour line.

Figure 2:
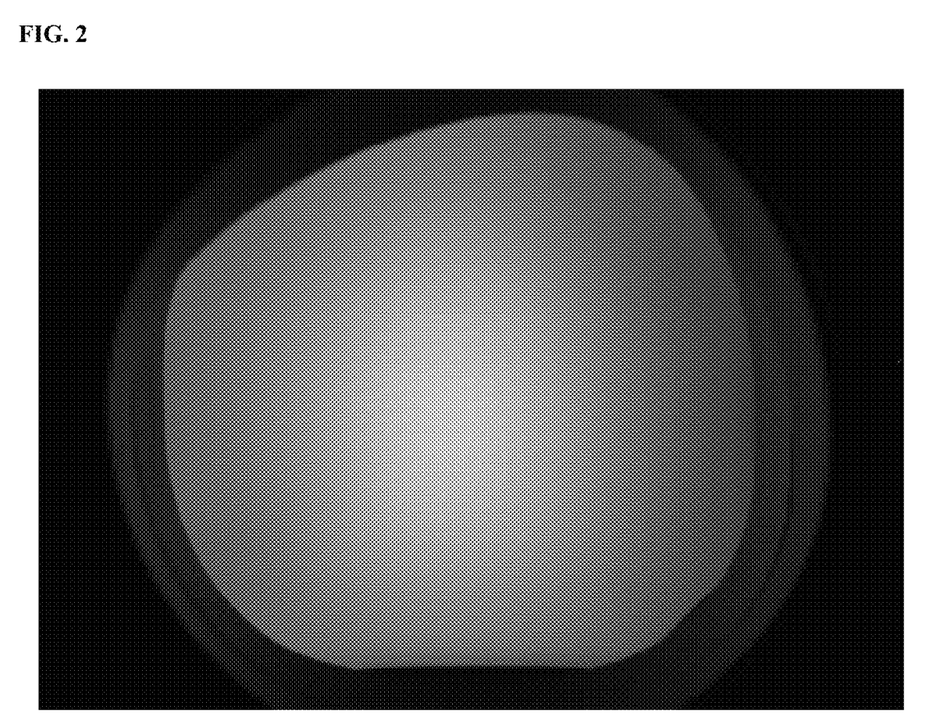
FIG. 2 is a gray image containing a screen.
Figure 3:
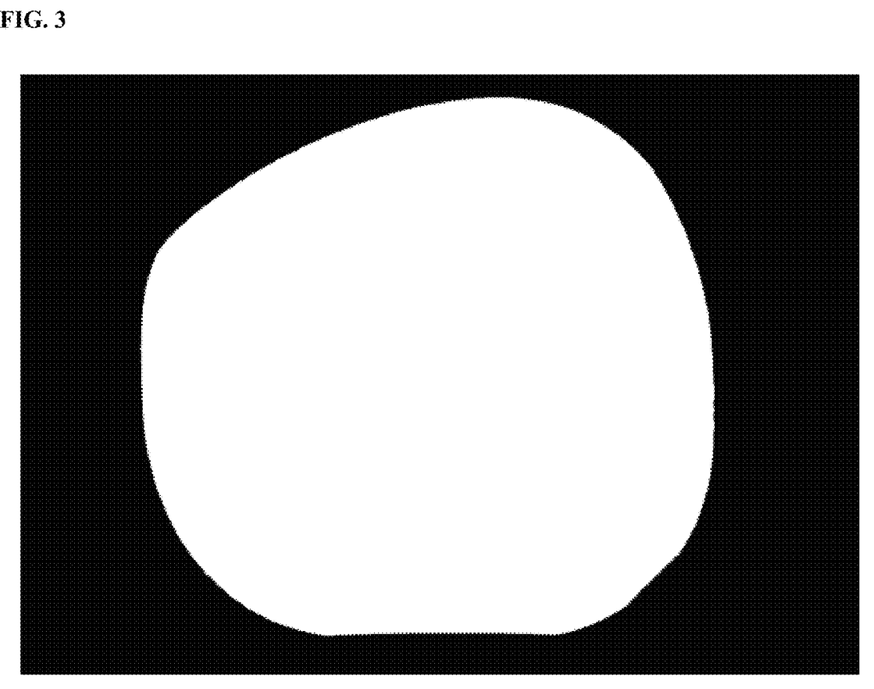
FIG. 3 is a binarized image of FIG. 2.
Figure 4:
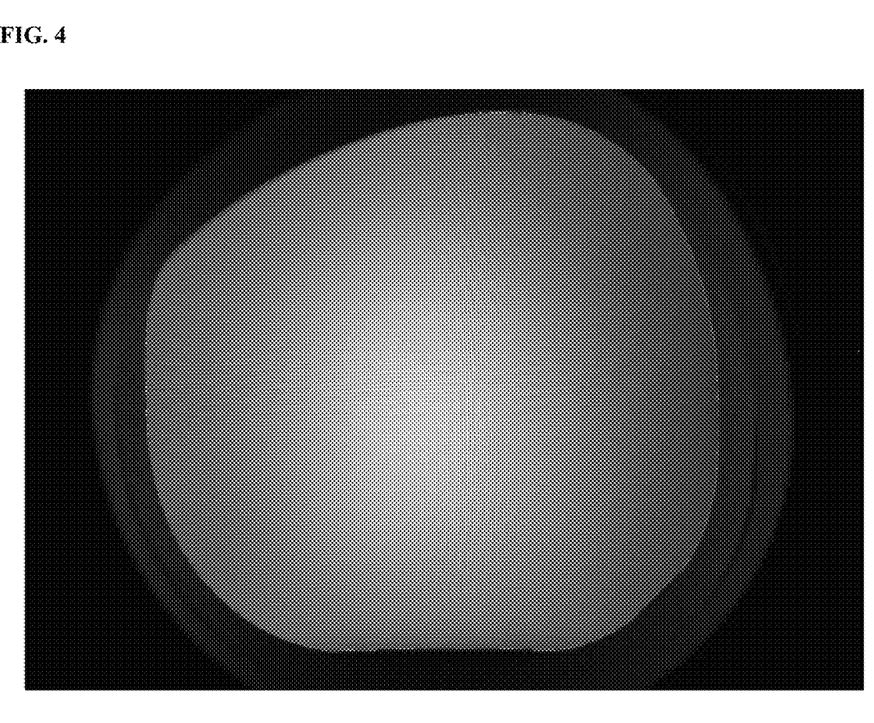
FIG. 4 is a schematic diagram of a contour line marked in FIG. 2.
Figure 5:
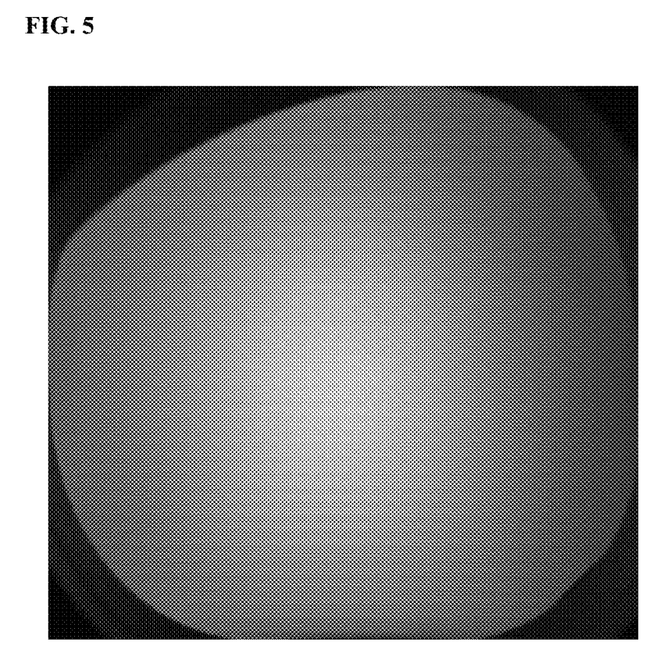
FIG. 5 is a detection image obtained according to FIG. 2.

For example, FIG. 2 is a gray image containing a screen. It can be seen that there is a light gray screen border around the screen, which will affect the subsequent processing. To solve this problem, FIG. 2 may be binarized to obtain a binary image as shown in FIG. 3, and then the screen contour search is performed on the binary image. This step may be realized by the existing technology. Then, according to the corresponding relationship between FIG. 2 and FIG. 3, the screen contour line obtained by the search is mapped into the gray image. As shown in FIG. 4, the white line around the screen is the screen contour line. Next, a circumscribed rectangle is determined according to the screen contour line, and the detection image as shown in FIG. 5 is obtained by clipping.

The identification of suspected defective pixel points can be realized by using filters based on image filtering algorithm. The filter here generally refers to filtering software, such as machine vision software Halcon. The filter can detect various types of pixel points. In the embodiment of the present disclosure, corresponding parameters may be set based on the characteristics of transparent defects, such as filtering out pixel points with lower brightness as suspected defective pixel points.

Step S120, determining a suspected defect region corresponding to a suspected defective pixel point in the detection image;

Suspected defective pixel points are generally scattered points, and there may be false or missed detection. Therefore, this step can be realized by determining the suspected defect region corresponding to a suspected defective pixel point and performing subsequent detection based on the suspected defect region, rather than only relying on the suspected defective pixel point itself.

It should be noted that there may be more than one suspected defective pixel point detected, so the suspected defect region corresponding to each suspected defective pixel point may be determined separately, that is, one-to-one correspondence between them is realized.

Step S130, dividing the suspected defect region into a general region and a core region;

Here, the general region mainly corresponds to a normal pixel point, and the core region mainly corresponds to a suspected defective pixel point, so as to facilitate the calculation and comparison of gray values below.

Step S140, judging whether the target screen has a transparent defect according to a mean gray value of the suspected defect region, a mean gray value of the general region and a minimum gray value of the core region.

In this way, it can be judged whether the target screen has a transparent defect by judging whether there is an abnormal local gray value in the suspected defect region, and the accuracy is very high.

It can be seen that, in the method shown in FIG. 1, the manual detection is replaced by automatic screen defect detection, which improves efficiency and saves labor costs; the suspected defective pixel points are detected by image filtering algorithm first, and then the combination of region division and gray value comparison is used to determine whether the target screen has a transparent defect, which improves the accuracy of defect detection.

In an embodiment of the present disclosure, in the above screen defect detection method, the step of determining a suspected defect region corresponding to a suspected defective pixel point in the detection image comprises: in the detection image, extracting a square region with a suspected defective pixel point as a center and a first preset value as a side length, and taking the square region as the suspected defect region corresponding to the suspected defective pixel point.

According to the analysis of transparent defects in actual scenes, foreign matters that cause transparent defects are generally not very large. Therefore, in some embodiments, the first preset value may be determined as 50 (pixels).

In an embodiment of the present disclosure, in the above screen defect detection method, the step of dividing the suspected defect region into a general region and a core region comprises: in the suspected defect region containing a suspected defective pixel point, drawing a circular region with the suspected defective pixel point as a center of the circle and a second preset value as a radius, and taking the circular region as the core region corresponding to the suspected defective pixel point; and taking all regions in the suspected defect region except the core region as the general region corresponding to the suspected defective pixel point.

Figure 6:
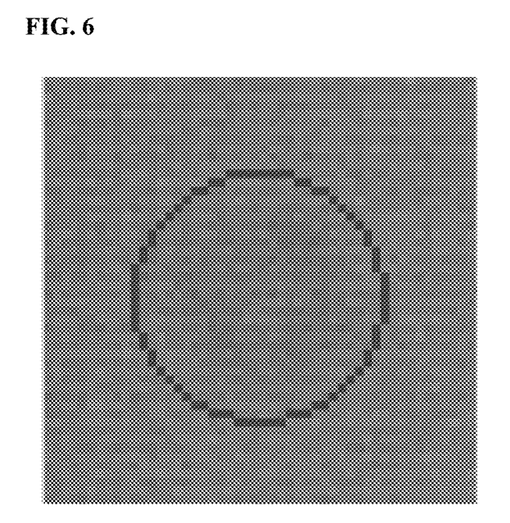
FIG. 6 is a schematic diagram of a suspected defect region according to an embodiment of the present disclosure.

For example, FIG. 6 is a schematic diagram of a suspected defect region according to an embodiment of the present disclosure. The circular region in FIG. 6 is the core region, and the region outside the circular region is the general region, and the combination of the two forms the suspected defect region.

When a circular region is taken as the core region, it is possible to fully cover the pixel points representing transparent defects in the suspected defect region and minimize the coverage of normal pixel points. The square suspected defect region can facilitate statistical calculation and extraction. In some embodiments, the second preset value may be selected as 15 (pixels).

In an embodiment of the present disclosure, in the above screen defect detection method, the step of judging whether the target screen has a transparent defect according to a mean gray value of the suspected defect region, a mean gray value of the general region and a minimum gray value of the core region comprises: calculating a ratio of the minimum gray value of the core region to the average gray value of the general region as a local contrast; calculating a ratio of the minimum gray value of the core region to the average gray value of the suspected defect region as a global contrast; and judging whether the target screen has a transparent defect by using the local contrast and the global contrast.

Specifically, when dividing the core region and the general region, the boundary between the core region and the general region may be marked with a contour line. Then the pixel points belonging to the core region and the pixel points belonging to the general region can be determined respectively according to the contour line, and according to the gray values of the pixel points and the regions in which the pixel points are located, the mean gray value of the suspected defect region, the mean gray value of the general region and the minimum gray value of the core region can be determined.

For example, the pointPolygonTest (vec, cv::Point (x, y), false) function can be used to judge whether a pixel point is inside or outside the contour line.

Then, the sum gray_out_sum of gray values of pixel points outside the contour line (i.e., the general region) is counted, the total number sum_out of pixel points is counted, and thus the average gray value gray_out_mean of the general region may be calculated by gray_out_mean=gray_out_sum/sum_out.

The sum gray_sum of gray values of pixel points inside the suspected defect region is counted, the first preset value is taken as 50 (i.e., for example, the suspected defect region is a region of 50*50 pixels), then the mean gray value gray_global_mean of the suspected defect region is gray_global_mean=gray_sum/(50*50).

Thus, the local contrast is gray_mean_contrast=gray_min/gray_out_mean, the global contrast is gray_global_mean_contrast=gray_min/gray_global_mean. The gray_min is the minimum gray value of the core region.

Then, it may be judged whether the target screen has a transparent defect according to the gray_mean_contrast and the gray_global_mean_contrast. In an embodiment of the present disclosure, the step of judging whether the target screen has a transparent defect by using the local contrast and the global contrast comprises: if an absolute value of a difference between the local contrast and the global contrast is between a first threshold and a second threshold, judging that the target screen has a transparent defect.

Namely, if the absolute value of the difference between the gray_mean_contrast and the gray_global_mean_contrast is greater than the first threshold thres_contrast_min and less than the second threshold thres_contrast_max, it is judged that the screen has a transparent defect.

Of course, besides the method of comparing the absolute value of the difference between local contrast and global contrast with two preset thresholds as stated above, the judgment may also be realized by setting only one minimum threshold and other methods.

Besides transparent defects, defects of the screen itself such as bad points of the screen may also cause similar appearances. However, these defects are usually sporadic. For example, there are one or two bad points on the screen, which may also cause low illumination (no light) of individual points of the screen. Therefore, transparent defects can be distinguished from other defects by calculating the defect area. Namely, in an embodiment of the present disclosure, in the above screen defect detection method, when it is determined that the target screen has a transparent defect, the defect area in the suspected defect region is calculated; if the defect area is less than an area threshold, it is determined that the transparent defect is a misjudged defect of another type.

For example, if six suspected defective pixel points are identified in the detection image, six suspected defect regions are obtained. Four suspected defect regions are determined respectively according to the mean gray value of the suspected defect region, the mean gray value of the general region, and the minimum gray value of the core region, each of which represents a transparent defect. Then, during the next misjudgment detection, the defect area in these four suspected defect regions is calculated respectively, and it is judged respectively whether each transparent defect is a misjudged defect of another type.

Specifically, in an embodiment of the present disclosure, in the above screen defect detection method, the step of calculating a defect area comprises: performing adaptive binarization on the suspected defect region to obtain a binary image in which a first color represents a normal screen and a second color represents a screen defect; and taking an area of a circumscribed rectangle of pixel points of the second color in the binary image as the defect area.

Figure 7:
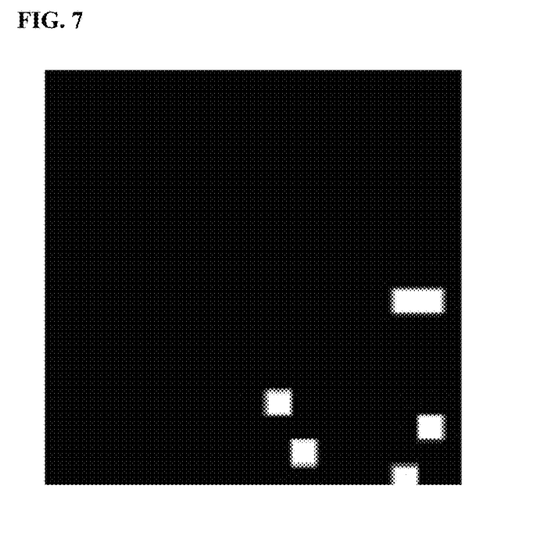
FIG. 7 is an image obtained by binarization of a suspected defect region.

For example, FIG. 7 is an image obtained by binarization of a suspected defect region, in which black represents a normal screen and white represents a screen defect. It is easy to understand that the color expression can be exchanged. FIG. 7 is an exemplary image that can highlight the defective part. It is more complicated to directly calculate the area of the white region. Due to the reasons that transparent defects are formed, foreign matters tend to gather. Therefore, the defect area can be obtained by calculating a circumscribed rectangle. Of course, in other embodiments, the defect area may also be calculated by calculating the circumscribed circle and other methods. The circumscribed rectangle has the advantage of low calculation.

It can be seen that, in this way, false inspection can be avoided. In the specific implementation, if the early detection efficiency is pursued, the transparent defect may be detected only by the method of counting and comparing gray values as stated above, and then rechecked manually. On the other hand, if a high detection accuracy is wanted, the transparent defects detected by the method of counting and comparing gray values may be taken as suspected transparent defects, and then it is finally determined whether there is a transparent defect by calculating the defect area.

Figure 8:
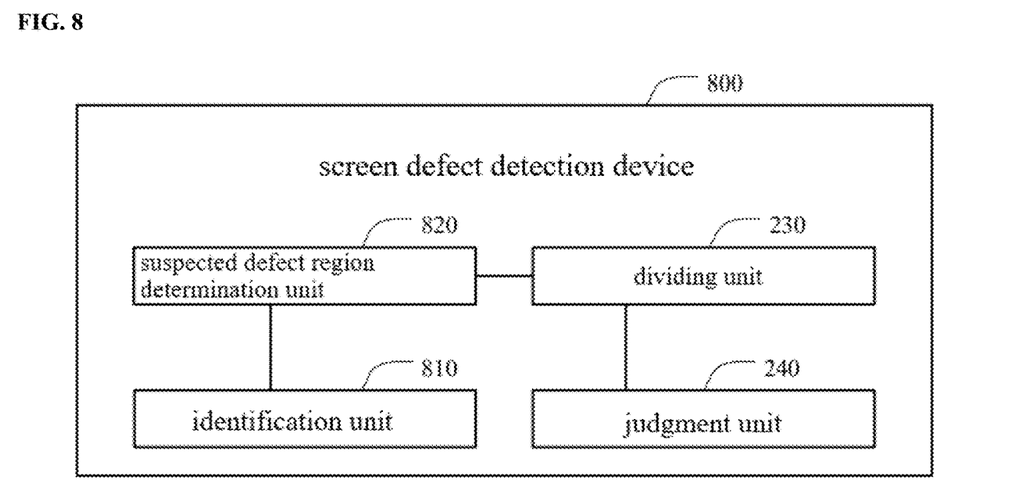
FIG. 8 is a schematic diagram of the structure of a screen defect detection apparatus according to an embodiment of the present disclosure.

FIG. 8 is a schematic diagram of the structure of a screen defect detection apparatus according to an embodiment of the present disclosure. As shown in FIG. 8, the screen defect detection apparatus 800 comprises:

an identification unit 810 for identifying a number of suspected defective pixel points from a detection image of a target screen;

Obtaining the detection image of the target screen is the basis for realizing automatic defect detection, which can generally be obtained by taking photo of the target screen. In order to facilitate the subsequent counting and calculation of gray values, the detection image may specifically be a gray image.

a suspected defect region determination unit 820 for determining a suspected defect region corresponding to a suspected defective pixel point in the detection image;

Suspected defective pixel points are generally scattered points, and there may be false or missed detection. Therefore, it can be achieved by determining the suspected defect region corresponding to a suspected defective pixel point and performing subsequent detection based on the suspected defect region, rather than only relying on the suspected defective pixel point itself.

It should be noted that there may be more than one suspected defective pixel point detected, so the suspected defect region corresponding to each suspected defective pixel point may be determined separately, that is, one-to-one correspondence between them is realized.

a dividing unit 830 for dividing the suspected defect region into a general region and a core region;

Here, the general region mainly corresponds to a normal pixel point, and the core region mainly corresponds to a suspected defective pixel point, so as to facilitate the calculation and comparison of gray values below.

a judgment unit 840 for judging whether the target screen has a transparent defect according to a mean gray value of the suspected defect region, a mean gray value of the general region and a minimum gray value of the core region.

In this way, it can be judged whether the target screen has a transparent defect by judging whether there is an abnormal local gray value in the suspected defect region, and the accuracy is very high.

It can be seen that, in the apparatus shown in FIG. 8, the manual detection is replaced by automatic screen defect detection, which improves efficiency and saves labor costs; the suspected defective pixel points are detected by image filtering algorithm first, and then the combination of region division and gray value comparison is used to determine whether the target screen has a transparent defect, which improves the accuracy of defect detection.

In an embodiment of the present disclosure, in the above apparatus, the judgment unit 840 is for calculating a ratio of the minimum gray value of the core region to the average gray value of the general region as a local contrast, calculating a ratio of the minimum gray value of the core region to the average gray value of the suspected defect region as a global contrast, and judging whether the target screen has a transparent defect by using the local contrast and the global contrast.

In an embodiment of the present disclosure, in the above apparatus, the judgment unit 840 is specifically for, if an absolute value of a difference between the local contrast and the global contrast is between a first threshold and a second threshold, judging that the target screen has a transparent defect.

In an embodiment of the present disclosure, in the above apparatus, the judgment unit 840 is also for, when it is determined that the target screen has a transparent defect, calculating a defect area in the suspected defect region; and if the defect area is less than an area threshold, determining that the transparent defect is a misjudged defect of another type.

In an embodiment of the present disclosure, in the above apparatus, the judgment unit 840 is for, performing adaptive binarization on the suspected defect region to obtain a binary image in which a first color represents a normal screen and a second color represents a screen defect; and taking an area of a circumscribed rectangle of pixel points of the second color in the binary image as the defect area.

In an embodiment of the present disclosure, the above apparatus further comprises: a detection image acquisition unit for obtaining an original image capable of containing the target screen; converting the original image into a gray image; detecting an effective region corresponding to the target screen from the gray image, and clipping the gray image according to the effective region to obtain the detection image of the target screen.

In an embodiment of the present disclosure, in the above apparatus, the suspected defect region determination unit 820 is for, in the detection image, extracting a square region with a suspected defective pixel point as a center and a first preset value as a side length, and taking the square region as the suspected defect region corresponding to the suspected defective pixel point.

In an embodiment of the present disclosure, in the above apparatus, the region dividing unit 830 is for, in the suspected defect region containing a suspected defective pixel point, drawing a circular region with the suspected defective pixel point as a center of the circle and a second preset value as a radius, taking the circular region as the core region corresponding to the suspected defective pixel point, and taking all regions in the suspected defect region except the core region as the general region corresponding to the suspected defective pixel.

It should be noted that the specific implementation of the above apparatus embodiments can be implemented with reference to the specific implementation of the above corresponding method embodiments, which will not be repeated here.

In sum, with respect to the problems that transparent defects are difficult to detect, and the detection direction needs to be changed at all times during manual detection, which will increase the labor intensity of operators, the technical solutions of the present disclosure can determine whether there is a transparent defect on the target screen by determining the suspected defect pixel point, counting and comparing the gray values, and rechecking the defect area. It has been proved through experiments that the solutions proposed in the present disclosure can be well applied to the automatic detection of transparent defects of OLED and other types of screens in the production line, which not only reduces the cost, but also reduces the damage to workers' eyes caused by this operation, improves the work efficiency and reduces the rate of missed detection.

It should be noted:

The algorithms and demonstrations given here are not intrinsically associated with any particular computer, virtual apparatus, or other device. All general-purpose apparatus can be used in conjunction with demonstrations here. Based on the above descriptions, architectures for constructing such a apparatus are apparent. In addition, the present disclosure is not dependent on any particular programming language. It is understandable that various programming languages can be used to realize contents of the present disclosure described herein, and that the above descriptions concerning specific languages are intended to reveal the best implementation of the present disclosure.

Those skilled in the art can understand that it is possible to adaptively change the modules in the device in the embodiments and set them in one or more devices different from the embodiments. The modules or units or components in the embodiments can be combined into one module or unit or component, and in addition, they can be divided into multiple sub-modules or sub-units or sub-components. Except that at least some of such features and/or processes or units are mutually exclusive, any combination can be used to combine all features disclosed in this specification (including the accompanying claims, abstract and drawings) and all processes or units of any method or device disclosed in such a way. Unless expressly stated otherwise, each feature disclosed in this specification (including the accompanying claims, abstract and drawings) may be replaced by an alternative feature providing the same, equivalent or similar object.

In addition, Those skilled in the art can understand that although some embodiments described herein include some but not other features included in other embodiments, combinations of features of different embodiments are meant to be within the scope of the present disclosure, and form different embodiments, as would be understood by those in the art. For example, in the following claims, any of the claimed embodiments can be used in any combination.

The various component embodiments of the present disclosure may be implemented by hardware, or by software modules running on one or more processors, or by their combination. Those skilled in the art should understand that a microprocessor or a digital signal processor (DSP) can be used in practice to implement some or all functions of some or all the components of the screen detection apparatus 800 according to the embodiments of the present disclosure. The present disclosure can also be implemented as a device or device program (for example, a computer program and a computer program product) for executing part or all of the methods described herein. Such a program for realizing the present disclosure may be stored on a computer-readable medium, or may have the form of one or more signals. Such signals can be downloaded from Internet websites, or provided on carrier signals, or provided in any other form.

Figure 9:
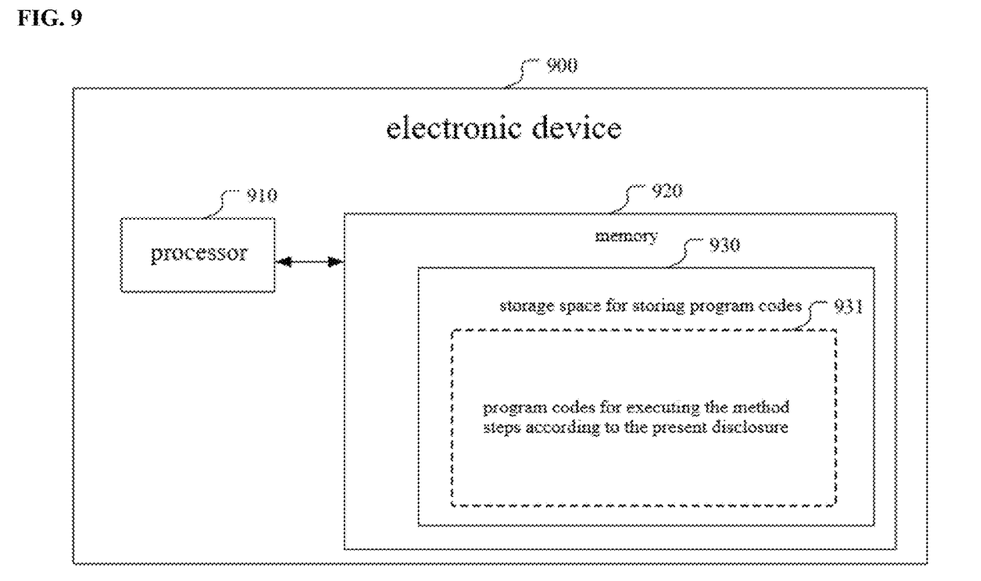
FIG. 9 is a schematic diagram of the structure of an electronic device according to an embodiment of the present disclosure.
Figure 10:
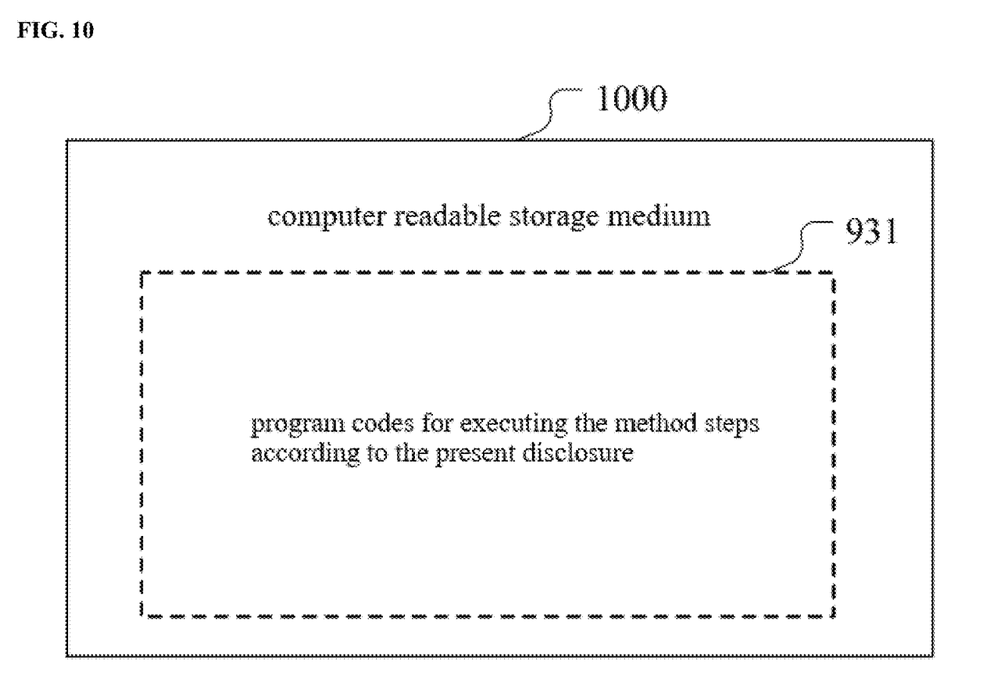
FIG. 10 is a block diagram of a computer-readable storage medium according to an embodiment of the present disclosure.

For example, FIG. 9 is a schematic diagram of the structure of an electronic device according to an embodiment of the present disclosure. The electronic device 900 comprises a processor 910 and a memory 920 configured to store computer-executable instructions (computer-readable program codes). The memory 920 may be an electronic memory such as flash memory, EEPROM (electrically erasable programmable read only memory), EPROM, hard disk, or ROM. The memory 920 has a storage space 930 for storing computer-readable program codes 931 for executing any method steps in the above methods. For example, the storage space 930 for storing computer-readable program codes may include various computer-readable program codes 931 respectively used to implement various steps in the above method. The computer-readable program code 931 may be read from or written into one or more computer program products. These computer program products include program code carriers such as hard disks, compact disks (CDs), memory cards or floppy disks. Such a computer program product is typically a computer-readable storage medium as shown in, for example, FIG. 10. FIG. 10 is a schematic diagram of the structure of a computer-readable storage medium according to an embodiment of the present disclosure. The computer-readable storage medium 1000 stores the computer-readable program code 931 for executing the method steps according to the present disclosure, which can be read by the processor 910 of the electronic device 900. When the computer-readable program code 931 is run by the electronic device 900, the electronic device 900 is caused to execute each step in the methods described above. Specifically, the computer-readable program code 931 stored in the computer-readable storage medium can execute the methods shown in any of the above embodiments. The computer-readable program code 931 may be compressed in an appropriate form.

It should be noted that the above embodiments illustrate rather than limit the present disclosure, and those skilled in the art can design alternative embodiments without departing from the scope of the appended claims. In the claims, any reference signs placed between parentheses should not be constructed as a limitation to the claims. The word "comprises" or "comprising" does not exclude the presence of elements or steps not listed in the claims. The word "a" or "an" preceding an element does not exclude the presence of multiple such elements. The present disclosure can be implemented by means of hardware comprising several different elements and by means of a suitably programmed computer. In the unit claims enumerating several devices, several of these devices may be embodied in the same hardware item. The use of the words "first", "second" and "third" does not indicate any order. These words can be interpreted as names.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A screen defect detection method, comprising the following steps:
   identifying a number of suspected defective pixel points from a detection image of a target screen;
   determining a suspected defect region corresponding to a suspected defective pixel point in the detection image;
   dividing the suspected defect region into a general region and a core region; and
   judging whether the target screen has a transparent defect according to a mean gray value of the suspected defect region, a mean gray value of the general region and a minimum gray value of the core region-, wherein the step of judging whether the target screen has a transparent defect according to a mean gray value of the suspected defect region, a mean gray value of the general region and a minimum gray value of the core region comprises:

calculating a ratio of the minimum gray value of the core region to the average gray value of the general region as a local contrast;

calculating a ratio of the minimum gray value of the core region to the average gray value of the suspected defect region as a global contrast; and judging whether the target screen has a transparent defect by using the local contrast and the global contrast.

2. The screen defect detection method according to claim 1, wherein the step of judging whether the target screen has a transparent defect by using the local contrast and the global contrast comprises:

if an absolute value of a difference between the local contrast and the global contrast is between a first threshold and a second threshold, judging that the target screen has a transparent defect.

3. The screen defect detection method according to claim 1, further comprising:

when it is determined that the target screen has a transparent defect, calculating a defect area in the suspected defect region; and if the defect area is less than an area threshold, determining that the transparent defect is a misjudged defect of another type.

4. The screen defect detection method according to claim 3, wherein the step of calculating a defect area comprises:

performing adaptive binarization on the suspected defect region to obtain a binary image in which a first color represents a normal screen and a second color represents a screen defect; and taking an area of a circumscribed rectangle of pixel points of the second color in the binary image as the defect area.

5. The screen defect detection method according to claim 1, further comprising:

obtaining an original image capable of containing the target screen;

converting the original image into a gray image; and detecting an effective region corresponding to the target screen from the gray image, and clipping the gray image according to the effective region to obtain the detection image of the target screen.

6. The screen defect detection method according to claim 1, wherein the step of determining a suspected defect region corresponding to a suspected defective pixel point in the detection image comprises:

in the detection image, extracting a square region with a suspected defective pixel point as a center and a first preset value as a side length, and taking the square region as the suspected defect region corresponding to the suspected defective pixel point.

7. The screen defect detection method according to claim 1, wherein the step of dividing the suspected defect region into a general region and a core region comprises:

in the suspected defect region containing a suspected defective pixel point, drawing a circular region with the suspected defective pixel point as a center of the circle and a second preset value as a radius, and taking the circular region as the core region corresponding to the suspected defective pixel point; and taking all regions in the suspected defect region except the core region as the general region corresponding to the suspected defective pixel point.

8. A screen defect detection apparatus, comprising:

an identification unit 810 for identifying a number of suspected defective pixel points from a detection image of a target screen;

a suspected defect region determination unit 820 for determining a suspected defect region corresponding to a suspected defective pixel point in the detection image;

a dividing unit 830 for dividing the suspected defect region into a general region and a core region; and a judgment unit 840 for judging whether the target screen has a transparent defect according to a mean gray value of the suspected defect region, a mean gray value of the general region and a minimum gray value of the core region.

9. The device according to claim 8, wherein the judgment unit 840 is for calculating a ratio of the minimum gray value of the core region to the average gray value of the general region as a local contrast, calculating a ratio of the minimum gray value of the core region to the average gray value of the suspected defect region as a global contrast, and judging whether the target screen has a transparent defect by using the local contrast and the global contrast.

10. An electronic device, comprising:

a processor; and a memory configured to store computer executable instructions, which cause the processor to execute the following processing when executed, identifying a number of suspected defective pixel points from a detection image of a target screen;

determining a suspected defect region corresponding to a suspected defective pixel point in the detection image;

dividing the suspected defect region into a general region and a core region; and judging whether the target screen has a transparent defect according to a mean gray value of the suspected defect region, a mean gray value of the general region and a minimum gray value of the core region.

11. The electronic device according to claim 9, wherein the computer executable instructions further cause the processor to execute the following processing:

calculating a ratio of the minimum gray value of the core region to the average gray value of the general region as a local contrast;

calculating a ratio of the minimum gray value of the core region to the average gray value of the suspected defect region as a global contrast; and judging whether the target screen has a transparent defect by using the local contrast and the global contrast.

12. The electronic device according to claim 10, wherein the computer executable instructions further cause the processor to execute the following processing: if an absolute value of a difference between the local contrast and the global contrast is between a first threshold and a second threshold, judging that the target screen has a transparent defect.

\* \* \* \* \*